United States Patent
Sato et al.

(10) Patent No.: US 12,277,785 B2
(45) Date of Patent: Apr. 15, 2025

(54) INFORMATION PROCESSING APPARATUS, COMPUTER-READABLE STORAGE MEDIUM, AND INFORMATION PROCESSING METHOD

(71) Applicants: KABUSHIKI KAISHA TOSHIBA, Tokyo (JP); Toshiba Infrastructure Systems & Solutions Corporation, Kawasaki (JP)

(72) Inventors: Masataka Sato, Kawasaki Kanagawa (JP); Hidetaka Kojima, Tokyo (JP); Kazutaka Asahi, Kawasaki Kanagawa (JP)

(73) Assignees: Kabushiki Kaisha Toshiba, Tokyo (JP); Toshiba Infrastructure Systems & Solutions Corporation, Kawasaki (JP)

(*) Notice: Subject to any disclaimer, the term of this patent is extended or adjusted under 35 U.S.C. 154(b) by 343 days.

(21) Appl. No.: 17/876,178

(22) Filed: Jul. 28, 2022

(65) Prior Publication Data
US 2022/0366712 A1    Nov. 17, 2022

Related U.S. Application Data

(63) Continuation of application No. PCT/JP2021/001316, filed on Jan. 15, 2021.

(30) Foreign Application Priority Data
Jan. 31, 2020    (JP) .................. 2020-015612

(51) Int. Cl.
G06V 30/148    (2022.01)
G06T 7/70    (2017.01)
(Continued)

(52) U.S. Cl.
CPC .............. G06V 30/153 (2022.01); G06T 7/70 (2017.01); G06V 10/768 (2022.01); *G06T 2207/30112* (2013.01)

(58) Field of Classification Search
CPC ...... G06V 30/153; G06V 10/768; G06T 7/70; G06T 2207/30112
See application file for complete search history.

(56) References Cited

U.S. PATENT DOCUMENTS 6,721,465 B1* 4/2004 Nakashima ............ G06V 10/10
    382/318
7,387,251 B2* 6/2008 Baker .................... G06K 17/00
    382/101
(Continued)

FOREIGN PATENT DOCUMENTS

JP    H8-101879 A    4/1996
JP    2000-279894 A    10/2000
(Continued)

OTHER PUBLICATIONS

Kazutaka Asahi et al., "Pay-per-Use Secondary OCR Service to Enhance Address Recognition Accuracy of Existing Parcel Sorting Machines," Toshiba Review, vol. 76, No. 5, pp. 23-26 (Sep. 2021) and machine translation (11 pages).

*Primary Examiner* — Gregory M Desire
(74) *Attorney, Agent, or Firm* — Finnegan, Henderson, Farabow, Garrett & Dunner, LLP

(57) ABSTRACT

According to an embodiment, an information processing apparatus includes a second recognition unit, an information processing unit, and an information output unit. The second recognition unit recognizes, by second recognition processing, a destination of an article with the destination not recognized by first recognition processing by a first recognition unit. The information processing unit generates recognition processing information proving that the second
(Continued)

recognition processing has been executed by the second recognition unit. The information output unit outputs the recognition processing information.

9 Claims, 5 Drawing Sheets

(51) Int. Cl.
  *G06V 10/70* (2022.01)
  *G06V 10/98* (2022.01)

(56) References Cited

U.S. PATENT DOCUMENTS

| | | | |
|---|---|---|---|
| 8,204,809 B1 * | 6/2012 | Wise | ............... G06Q 40/06 705/36 R |
| 10,361,802 B1 * | 7/2019 | Hoffberg-Borghesani | ................. G06F 3/00 |

FOREIGN PATENT DOCUMENTS

| | | | |
|---|---|---|---|
| JP | 2001-9381 A | 1/2001 |
| JP | 2001-113233 A | 4/2001 |
| JP | 2001-225027 A | 8/2001 |
| JP | 2002-55727 A | 2/2002 |
| JP | 2008-80300 A | 4/2008 |
| JP | 2013-212444 A | 10/2013 |
| JP | 2019-57307 A | 4/2019 |
| JP | 2019-109729 A | 7/2019 |

* cited by examiner

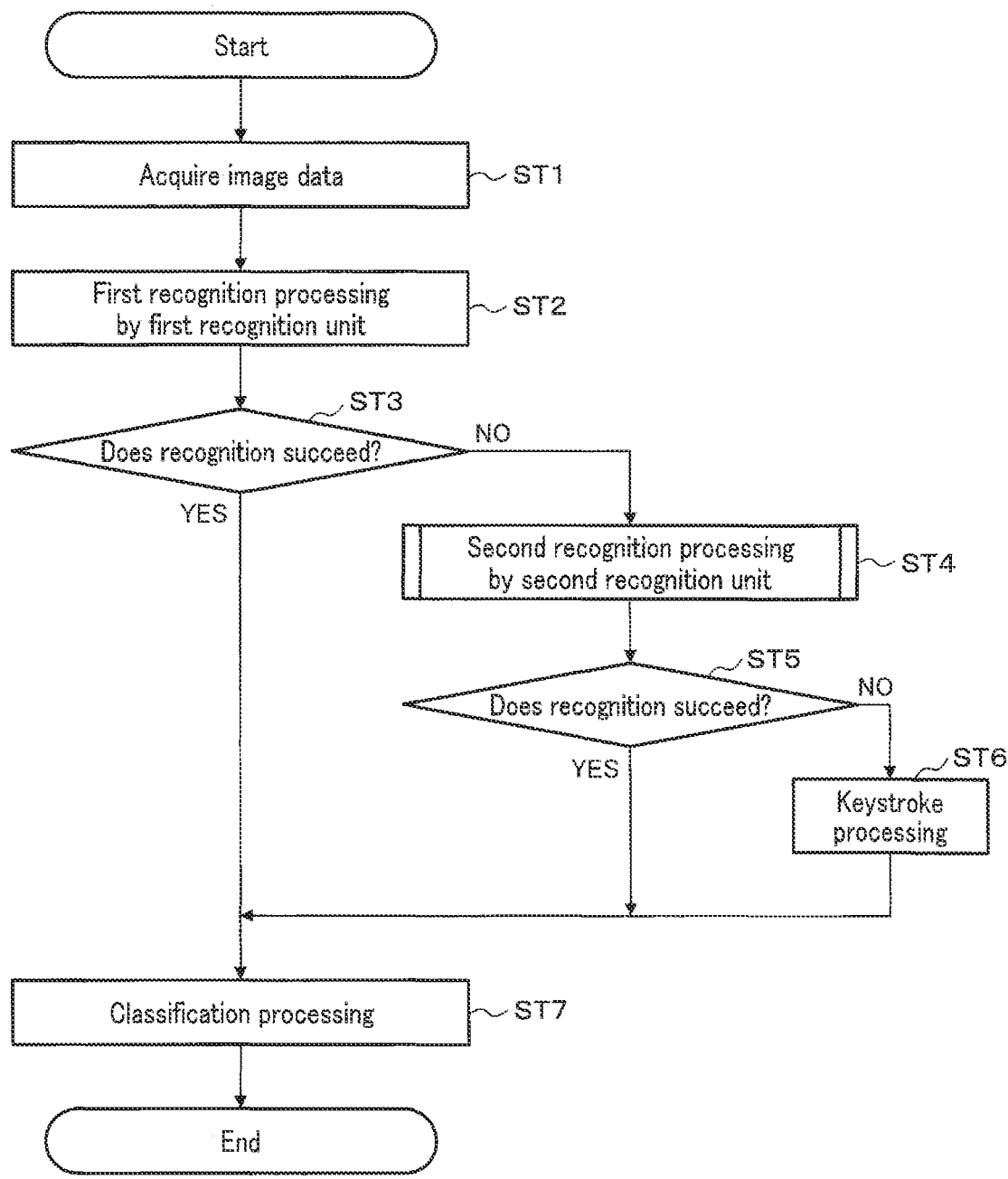
F I G. 3

INFORMATION PROCESSING APPARATUS, COMPUTER-READABLE STORAGE MEDIUM, AND INFORMATION PROCESSING METHOD

CROSS REFERENCE TO RELATED APPLICATIONS

This application is a Continuation Application of PCT Application No. PCT/JP2021/001316, filed. Jan. 15, 2021 and based upon and claiming the benefit of priority from Japanese Patent Application No. 2020-015612, filed Jan. 31, 2020, the entire contents of all of which are incorporated herein by reference.

FIELD

Embodiments of the present invention relate to an information processing apparatus, a computer-readable storage medium, and an information processing method.

BACKGROUND

An article processing system for classifying articles such as a baggage or paper sheet is widely used. The article processing system reads an image of an article to be conveyed, recognizes destination information included in the read image, designates a classification destination according to the destination recognition result, and classifies the article to be conveyed into the designated classification destination.

In the article processing system, various measures are taken to acquire the destination information. For example, a mechanism is known in which when a recognition unit fails to recognize the destination information from the image of the article, an operator visually checks the image of the article displayed on a display unit and inputs the destination of the article with a keyboard. A mechanism is also known in which a plurality of recognition units is used to improve the recognition rate, each recognition unit adopts different recognition processing, and by using the destination information recognized by at least one recognition unit, the frequency of keyboard input by the operator is reduced.

BRIEF DESCRIPTION OF THE DRAWINGS

FIG. 3 is a flowchart showing one example of article processing by the article processing system according to the embodiment.

DETAILED DESCRIPTION

According to an embodiment, an information processing apparatus includes a second recognition unit, an information processing unit, and an information output unit. The second recognition unit recognizes, by second recognition processing, a destination of an article with the destination not recognized by first recognition processing by a first recognition unit. The information processing unit generates recognition processing information proving that the second recognition processing has been executed by the second recognition unit. The information output unit outputs the recognition processing information.

An embodiment will be described below with reference to the drawings.

Figure 1:
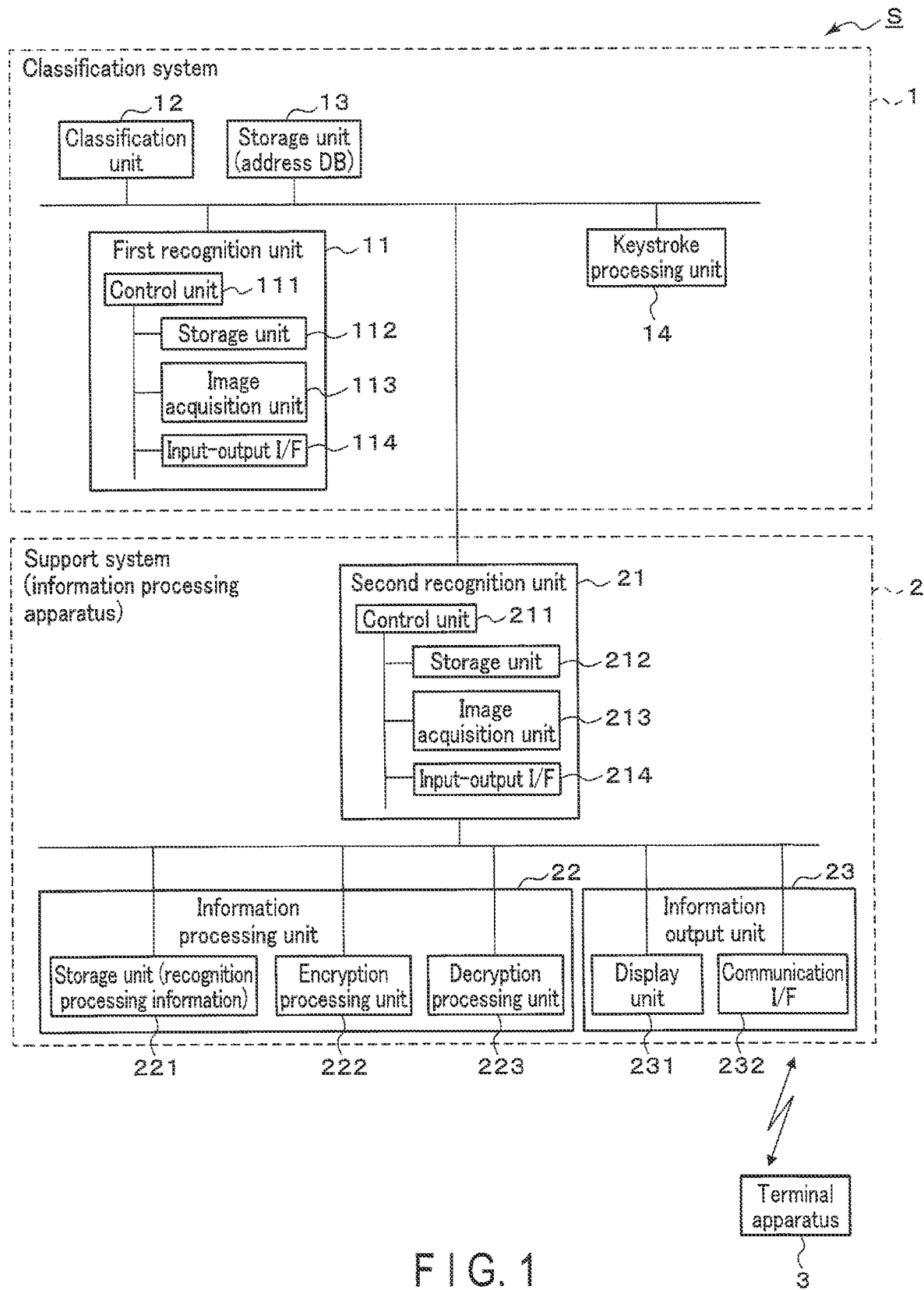
FIG. 1 is a block diagram showing one example of a schematic configuration of an article processing system according to an embodiment.

FIG. 1 is a block diagram showing one example of a schematic configuration of an article processing system according to the embodiment.

As shown in FIG. 1, an article processing system S includes a classification system 1 and a support system 2 (information processing apparatus). For example, it is possible to add the support system 2 later to the article processing system S including the classification system 1. It is also possible to install the article processing system S including the classification system 1 at an article depot, and to connect the support system 2 to the article processing system S via a communication network as a cloud server.

The classification system 1 includes a first recognition unit 11 (first recognition unit), a classification unit 12, a storage unit 13, and a keystroke processing unit 14. The first recognition unit 11, the classification unit 12, the storage unit 13, and the keystroke processing unit 14 are connected to each other via the communication network or the like.

The support system 2 includes a second recognition unit 21, an information processing unit 22, and an information output unit 23. The second recognition unit 21, the information processing unit 22, and the information output unit 23 are connected to each other via the communication network or the like. The information processing unit 22 includes a storage unit 221, an encryption processing unit 222, and a decryption processing unit 223. The information output unit 23 includes a display unit 231 and a communication interface 232.

Each of the classification system 1 and the support system 2 includes the recognition unit that recognizes the destination, thereby improving the recognition rate of the article processing system S as a whole.

To begin with, the classification system 1 will be described.

The first recognition unit 11 includes a control unit 111, a storage unit 112, an image acquisition unit 113, and an input-output interface (I/F) 114. The first recognition unit 11 recognizes a destination from image data obtained by capturing an image of an article conveyance area based on first recognition processing. Based on the first recognition processing a plurality of times, the recognition processing is executed on a plurality of articles or a plurality of article groups to be conveyed. The article is a paper sheet, a parcel, or the like, and the article is provided with destination information.

The control unit 111 is a central processing unit (CPU), a micro processing unit (MPU), a digital signal processor (DSP), or the like. Alternatively, the control unit 111 is a combination of some of these processors. The control unit 111 corresponds to a central part of a computer that executes arithmetic operations and control in order to implement various functions based on a program such as system software, application software, or firmware stored in the storage unit 112. The control unit 111 executes arithmetic operations and control necessary for recognition processing for recognizing the destination information on the article such as a baggage or paper sheet based on the image data.

In the present embodiment, the recognition of the destination information by the control unit 111 is one or both of optical character recognition (OCR) processing and code recognition processing. In the OCR processing, the destination information is recognized from image data of the article in which the destination information including characters, numbers, symbols, and the like such as zip code, address, and addressee (address information) is recorded or attached. In the code recognition processing, the destination information is recognized from the image data of the article in which a barcode or the like indicating the destination information is recorded or attached.

The storage unit 112 is a non-transitory computer-readable storage medium including a read-only memory (ROM) corresponding to a main storage unit of a computer, a random-access memory (RAM), and an auxiliary storage unit. The ROM is a non-transitory storage medium used for reading data, such as a non-volatile memory. The ROM may store at least part of the program executed by the control unit 111. The ROM also stores data or various setting values used by the control unit 111 to execute various types of processing.

The RAM is a memory used for reading and writing data. The RAM is used as a so-called work area or the like for storing data temporarily used by the control unit 111 to execute various types of processing.

The auxiliary storage unit is a non-transitory storage medium such as an electric erasable programmable read-only memory (EEPROM) (registered trademark), a hard disk drive (HDD), or a solid state drive (SSD). The auxiliary storage unit may store at least part of the program executed by the control unit 111. The auxiliary storage unit also stores data used by the control unit 111 to execute various types of processing, data generated by processing by the control unit 111, various setting values, or the like. For example, the auxiliary storage unit stores an address database for first recognition generated from an address database.

The image acquisition unit 113 is an image input-output interface, and the image input-output interface acquires image data in which the destination information is to be recognized. The image data is output from a first camera that captures an image of the article conveyance area. The image input-output interface ma transfer the acquired image data to another system. For example, the image input-output interface may transfer the acquired image data to the support system 2. The input-output interface 114 outputs recognition results of the destination information by the control unit 111, and the like.

The classification unit 12 conveys the article in which the destination information is recorded or attached, and classifies the article to the designated classification destination from a plurality of classification destinations based on a classification control signal generated according to the recognition result of the destination information. The storage unit 13 stores the address database and the like. The keystroke processing unit 14 includes a display unit and an input unit. The display unit displays an image of an article of which the destination information is not recognized. An operator visually checks the image on the display unit and inputs the destination from the input unit.

Next, the support system 2 will be described.

The second recognition unit 21 includes a control unit 211, a storage unit 212, an image acquisition unit 213, and an input-output interface (I/F) 214. The second recognition unit 21 recognizes the destination from the image data obtained by capturing the image of the article conveyance area based on second recognition processing different from the first recognition processing. Based on the second recognition processing a plurality of times, the recognition processing is executed on a plurality of articles or a plurality of article groups to be conveyed.

For example, when the first recognition unit 11 attempts to recognize the destination of the article from the image data based on the first recognition processing but fails to recognize the destination, the second recognition unit 21 attempts to recognize the destination of the article from the image data based on the second recognition processing. That is, the second recognition unit 21 attempts to recognize the destination of the article of which the destination has not been recognized by the first recognition processing.

The control unit 211 is a CPU, MPU, DSP, or the like. Alternatively, the control unit 211 is a combination of some of these processors. The control unit 211 corresponds to a central part of a computer that executes arithmetic operations and control in order to implement various functions based on a program such as system software, application software, or firmware stored in the storage unit 212. The control unit 211 executes arithmetic operations and control necessary for recognition processing for recognizing the destination information on the article such as a baggage or paper sheet based on the image data.

In the present embodiment, the recognition of the destination information by the control unit 211 is one or both of OCR processing and code recognition processing. In the OCR processing, the destination information is recognized from image data of the article in which the destination information including characters, numbers, symbols, and the like such as zip code, address, and addressee (address information) is recorded or attached. In the code recognition processing, the destination information is recognized from the image data of the article in which a barcode or the like indicating the destination information is recorded or attached.

The storage unit 212 is a non-transitory computer-readable storage medium including a ROM corresponding to the main storage unit of the computer, RAM, and an auxiliary storage unit. The ROM is a non-transitory storage medium used for reading data, such as a non-volatile memory. The ROM may store at least part of the program executed by the control unit 211. The ROM also stores data or various setting values used by the control unit 211 to execute various types of processing.

The RAM is a memory used for reading and writing data. The RAM is used as a so-called work area or the like for storing data temporarily used by the control unit 211 to execute various types of processing.

The auxiliary storage unit is a non-transitory storage medium such as an EEPROM, HDD, or SSD. The auxiliary storage unit may store at least part of the program executed by the control unit 211. The auxiliary storage unit also stores data used by the control unit 211 to execute various types of processing, data generated by processing by the control unit 211, various setting values, or the like. For example, the auxiliary storage unit stores an address database for second recognition generated from the address database.

The image acquisition unit 213 is an image input-output interface, and the image input-output interface acquires image data in which the destination information is to be recognized. The image data is output from a second camera that captures an image of the article conveyance area. Alternatively, the image data is image data transferred from the image acquisition unit 213. The input-output interface 214 outputs recognition results of the destination information by the control unit 211, and the like.

The information processing unit 22 generates recognition processing information proving that the second recognition processing was executed by the second recognition unit 21. The storage unit 221 stores the recognition processing information. The encryption processing unit 222 encrypts the recognition processing information. The decryption processing unit 223 decrypts the encrypted recognition processing information. The information output unit 23 outputs the recognition processing information. For example, the display unit 231 displays the recognition processing information, and the communication interface 232 transmits the recognition processing information to a terminal apparatus 3.

The terminal apparatus 3 is a general-purpose computer and includes a control unit including one or more processors, a storage unit, a communication interface, an input-output interface, and the like. The communication interface receives the recognition processing information, and the control unit generates form data from the received recognition processing information and outputs the form data via the input-output interface.

Figure 2:
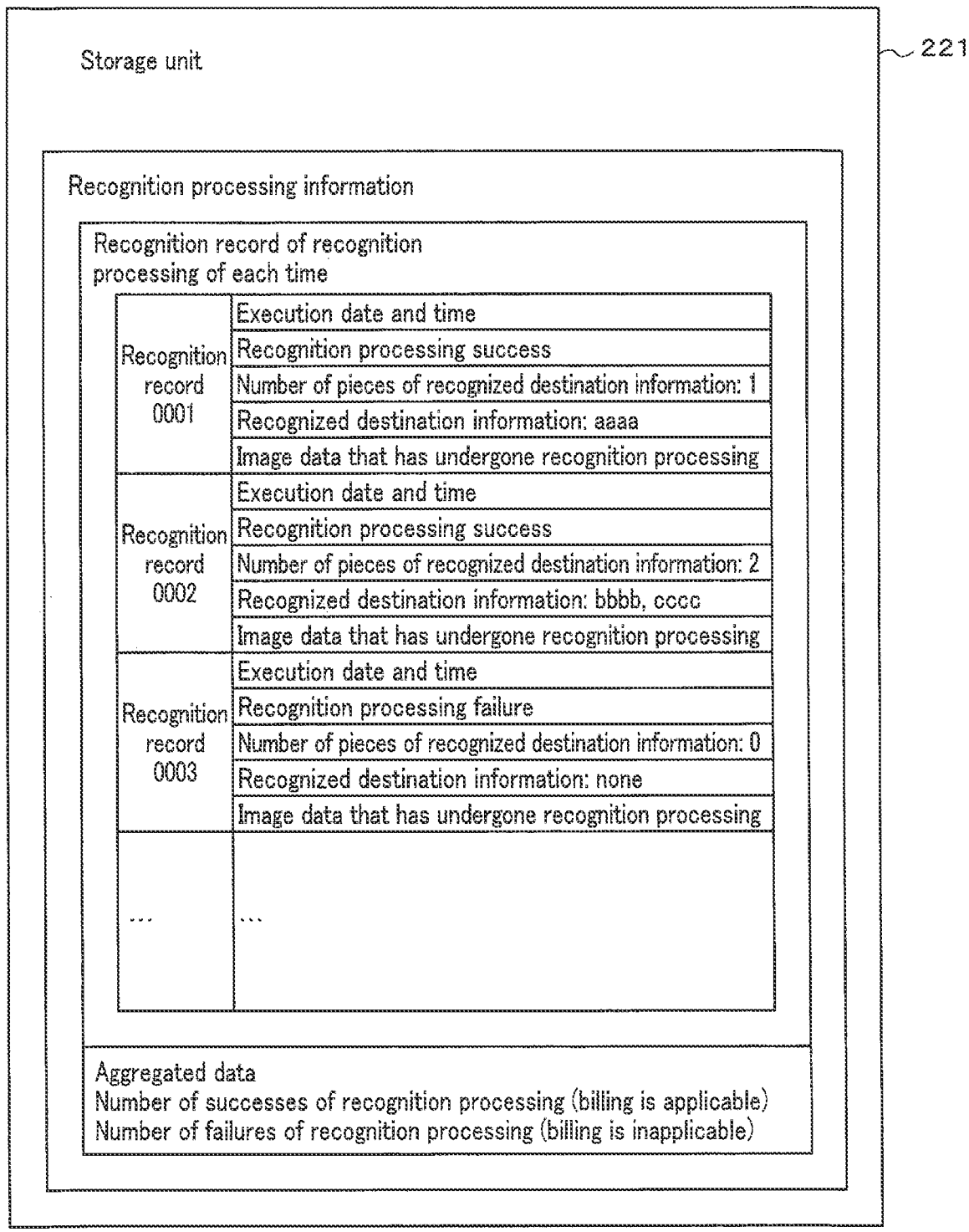
FIG. 2 is a diagram showing one example of recognition processing information generated by a support system according to the embodiment.

FIG. 2 is a diagram showing one example of the recognition processing information generated by the support system according to the embodiment.

As shown in FIG. 2, the recognition processing information stored in the storage unit 221 includes recognition records of respective types of recognition processing (second recognition processing of each time) and aggregated data. For example, each recognition record includes the execution date and time of the recognition processing, recognition processing success or recognition processing failure, the number of pieces of recognized destination information, the recognized destination information, and the image data that has undergone the recognition processing. The aggregated data includes the number of successes of the recognition processing (billing is applicable) and the number of failures of the recognition processing (billing is inapplicable). The recognition processing success or the number of pieces of recognized destination information (1 or more) included in the recognition processing information indicates billing is applicable (number of billing 1). The recognition processing failure or the number of pieces of recognized destination information (0) indicates billing is inapplicable. For example, when one or more pieces of destination information is recognized by one-time recognition processing, the recognition processing success is set (that is, billing is applicable) and all the recognized destination information is recorded. The information processing unit 22 may set a billing flag 1 indicating that billing is applicable when the recognition processing is successful, and set a billing flag 0 indicating that billing is inapplicable when the recognition processing fails. Note that when a plurality of pieces of destination information is recognized by one-time recognition processing, the recognition processing failure may be set (that is billing is inapplicable), the recognized destination information may not be recorded, and an item of the recognized destination information may be left blank.

Here, the recognition success and failure will be supplemented. For example, the case where the second recognition unit 21 can narrow down one or more pieces of destination information from information obtained by the recognition processing such as characters, numbers, and symbols is defined as the recognition success, that is, the case where one or more classification destinations can be determined from information obtained by the recognition processing is defined as the recognition success. The case where the destination information cannot be narrowed down, that is, the case where the classification destination cannot be determined is defined as the recognition failure. Therefore, when one or more pieces of destination information can be narrowed down from information obtained by one-time recognition processing, the number of successes of the recognition processing is counted (+1). When the destination information cannot be narrowed down from the information obtained by one-time recognition processing, the number of failures of the recognition processing is counted (+1).

FIG. 3 is a flowchart showing one example of article processing by the article processing system according to the embodiment.

The classification unit 12 conveys an article, the image acquisition unit 113 acquires image data from the first camera that captures an image of the article conveyance area (ST1), and the image acquisition unit 213 also acquires image data from the second camera that captures an image of the article conveyance area. The first recognition unit 11 executes the first recognition processing and attempts to recognize the destination information from the image data acquired by the image acquisition unit 113 (ST2). When the first recognition unit 11 succeeds in recognizing the destination information (ST3, YES), the classification unit 12 designates the classification destination based on the recognized destination information, and classifies the article to the designated classification destination (ST7).

When the first recognition unit 11 fails to recognize the destination information (ST3, NO), the second recognition unit 21 executes the second recognition processing and attempts to recognize the destination information from the image data acquired by the image acquisition unit 213 (ST4). When the second recognition unit 21 succeeds in recognizing the destination information (ST5, YES), the classification unit 12 designates the classification destination based on the recognized destination information and classifies the article to the designated classification destination (ST7).

When the second recognition unit 21 fails to recognize the destination information (ST5, NO), the keystroke processing unit 14 displays the image based on the image data acquired by the image acquisition units 113 and 213, and the operator visually checks the displayed image and inputs the destination of the article included in the image with a keyboard. The classification unit 12 designates the classification destination based on the input destination information, and classifies the article to the designated classification destination (ST7).

Figure 4:
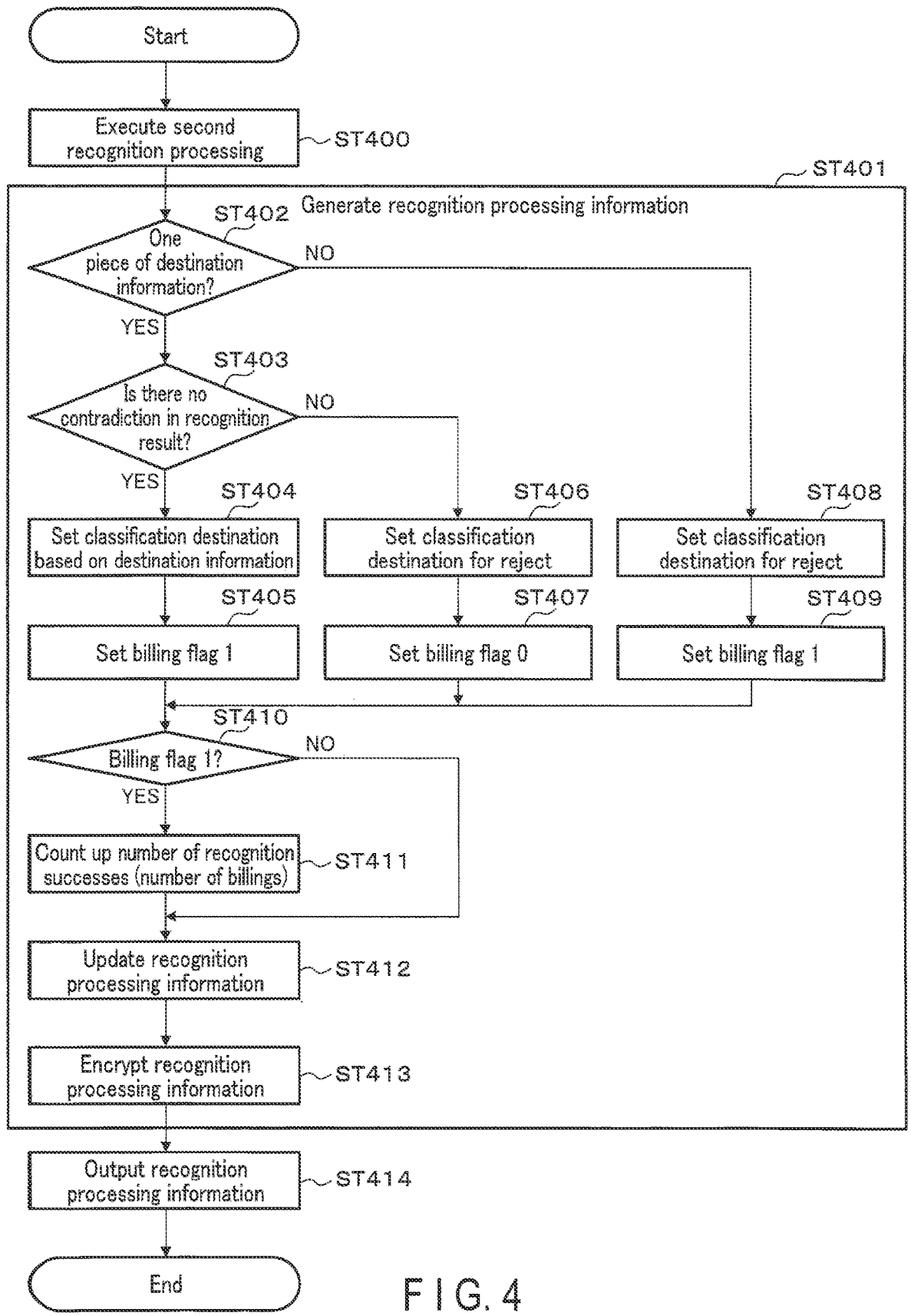
FIG. 4 is a flowchart showing one example of second recognition processing and the like by the support system according to the embodiment.

FIG. 4 is a flowchart showing one example of the second recognition processing and the like by the support system according to the embodiment. In this flowchart, generation and management of the recognition processing information in the second recognition processing will be described in detail. This flowchart describes a case where the billing flag 1 or 0 is set and the billing flag 1 or 0 enables determination whether billing is applicable or billing is inapplicable, but setting the billing flag 1 or 0 is not mandatory, and it may be determined whether billing is applicable or billing is inapplicable, based on information such as recognition success or failure of the destination information.

When the first recognition unit 11 fails to recognize the destination information, the second recognition unit 21 executes the second recognition processing (ST400). In response to the execution of the second recognition processing, the information processing unit 22 generates and stores the recognition processing information proving that the second recognition processing has been executed (ST401). As shown in FIG. 2, the recognition processing information includes the recognition record of the second recognition processing of each time and the aggregated data. The information output unit 23 outputs the generated recognition processing information (ST414).

The generation of the recognition processing information will be described in detail.

When the second recognition unit 21 recognizes one piece of destination information in the second recognition processing (Nth time) (ST402, YES) and determines that there is no contradiction in comparison of the address database for recognition with the recognized destination information (ST403, YES), the information processing unit 22 sets the classification destination based on the recognized destination information (ST404), and sets the billing flag 1 (ST405). In this case, the information processing unit 22 generates the recognition record of the Nth second recognition processing, and the recognition record of the Nth second recognition processing includes the recognition processing execution date and time, the recognition processing success (billing flag 1), the number of pieces of recognized destination information (1), the recognized destination information, and image data that has undergone the recognition processing.

When the second recognition unit 21 recognizes one piece of destination information in the (N+1)th second recognition processing (ST402, YES) and determines that there is contradiction in comparison of the address database for recognition with the recognized destination information (ST403, NO), the information processing unit 22 sets the classification destination for reject (ST406), and sets the billing flag 0 (ST407). In this case, the information processing unit 22 generates the recognition record of the (N+1)th second recognition processing, and the recognition record of the (N+1)th second recognition processing includes the recognition processing execution date and time, the recognition processing success (billing flag 0), the number of pieces of recognized destination information (0), the recognized destination information (none), and image data that has undergone the recognition processing.

When the second recognition unit 21 recognizes a plurality of (for example, two) pieces of destination information in the (N+2)th second recognition processing (ST402, NO), the information processing unit 22 sets the classification destination for reject (ST408) and sets the billing flag 1 (ST409). There are cases where a plurality of articles is not separated well in the process of taking in the articles and is conveyed as an article group, and in such cases, a plurality of pieces of destination information may be recognized. For example, when the article is a paper sheet such as a slip, the article can be conveyed as an article group. In this case, the information processing unit 22 generates the recognition record of the (N+2)th second recognition processing, and the recognition record of the (N+2)th second recognition processing includes the recognition processing execution date and time, the recognition processing success (billing flag 1), the number of pieces of recognized destination information (for example, 2), the recognized destination information (for example, two pieces of destination information), and image data that has undergone the recognition processing.

When the recognition record includes the billing flag 1 (ST410, YES), the information processing unit 22 counts up the number of billings (ST411) and updates the recognition processing information (ST412). The storage unit 221 stores the updated recognition processing information. To prevent falsification of the recognition processing information, the encryption processing unit 222 encrypts the recognition processing information as appropriate (ST413). For example, the information processing unit 22 saves the recognition processing information on the memory of the second recognition unit (storage unit 212) in the storage unit 221, and encrypts the recognition processing information stored in the storage unit 221. Alternatively, the information processing unit 22 encrypts the recognition record of the recognition processing of each time on the memory, and stores the encrypted recognition record of the recognition processing of each time in the storage unit 221.

The information output unit 22 outputs the recognition processing information to each output destination (ST414). For example, the display unit 231 displays the recognition processing information decrypted by the decryption processing unit 223, and the communication interface 232 transmits the encrypted recognition processing information to the terminal apparatus 3.

Here, the first recognition processing executed by the first recognition unit 11 and the second recognition processing executed by the second recognition unit 21 will be supplemented. For example, the first recognition processing executed by the first recognition unit 11 differs from the second recognition processing executed by the second recognition unit 21 in the following points. Even if the destination cannot be recognized by the first recognition unit 11, the destination may be recognized by the second recognition unit 21.

The first recognition unit 11 generates the address database for first recognition from the address database (DB) stored in the storage unit 13, and recognizes the destination based on the address database for first recognition. The second recognition unit 21 generates the address database for second recognition different from the address database for first recognition from the address database stored in the storage unit 13, and recognizes the destination based on the address database for second recognition.

Alternatively, the method of detecting characters, numbers, symbols, and codes may be changed between the first recognition processing executed by the first recognition unit 11 and the second recognition processing executed by the second recognition unit 21. Alternatively, different image data may be used between the first recognition processing executed by the first recognition unit 11 and the second recognition processing executed by the second recognition unit 21. The different image data is image data obtained by capturing an image of the same article or the same article group, but is image data captured by different methods (different capturing positions, different capturing directions, different light sources, or the like).

Here, the address database for recognition will be supplemented. The first recognition unit 11 and the second recognition unit 21 extract candidates for each character or word from the destination information (address) included in the image data, and compares the extracted character or word with the character or word registered in the address database. When using an address database in which a huge number of addresses exceeding millions are registered, the load of the comparison processing is heavy, and a lot of time is required for the comparison processing.

Therefore, the address database for recognition that can be rewritten from the address database is used. For example, the address database for recognition is a tree-structured address hierarchy database corresponding to a plurality of addresses included in the address database. The address hierarchy includes countries, prefectures, wards, cities, towns, villages, zip codes, and the like. Such an address database for recognition can compress the data size to a fraction or a few percent of the data size as compared with the address database while maintaining the amount of information in the address database.

The first recognition unit 11 and the second recognition unit 21 use different algorithm to analyze the structure of the address hierarchy of the address database, and generates the address database for recognition from the address database. The first recognition unit 11 and the second recognition unit 21 use different algorithm to compare the extracted characters or words with the characters or words registered in the address database. For example, the address is narrowed down in the order of country name, city name, zip code, and town name, or higher priority is given to the zip code, and the address is narrowed down in the order of country name, zip code, city name, and town name. In this way, the first recognition unit 11 and the second recognition unit 21 adopt different algorithm, thereby making it possible to improve the probability that the destination that cannot be recognized by one recognition unit can be recognized by the other recognition unit.

Figure 5:
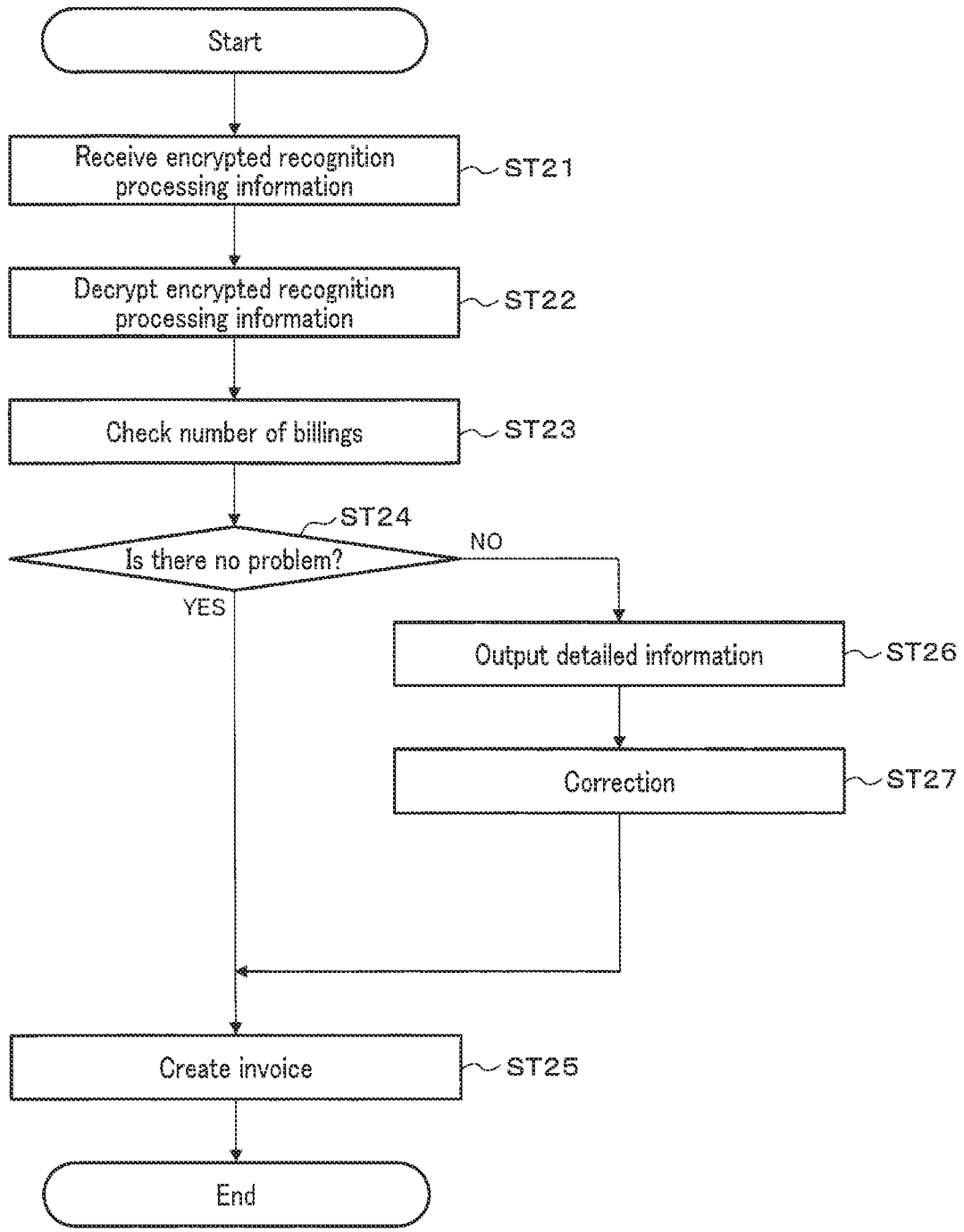
FIG. 5 is a flowchart showing one example of invoice creation processing by a terminal apparatus according to the embodiment.

FIG. 5 is a flowchart showing one example of invoice creation processing by the terminal apparatus according to the embodiment.

For example, the terminal apparatus 3 is operated by a person who has appropriate authority. The terminal apparatus 3 receives the encrypted recognition processing information (ST21) and decrypts the encrypted recognition processing information (ST22).

The terminal apparatus 3 checks the number of billings based on the recognition processing information (ST23), and when it is determined that there is no problem with the validity of the number of billings (ST24, YES), the terminal apparatus 3 creates an invoice based on the recognition processing information and outputs the invoice (ST25). For example, the recognition processing information includes the recognition record of the second recognition processing of each time and the aggregated data. When the aggregation result of the billing flag included in the recognition record of the second recognition processing of each time agrees with the aggregation result indicated by the aggregated data, it is determined that there is no problem with the validity.

Upon determination that there is a problem with the validity of the number of billings (ST24, NO), the terminal apparatus 3 displays detailed information based on the recognition processing information (ST26), receives correction input the person in charge (ST27), creates an invoice, and outputs the invoice (ST25).

The embodiment described above can provide an information processing apparatus, a program, a computer-readable storage medium, and an information processing method that can output the recognition processing information that is highly reliable and can easily prove validity.

When the pay-per-use billing system is adopted in the article processing system S, high reliability is required for the recognition processing information of the classification system 1 and the support system 2, which is the basis of billing. In a case where the support system 2 is retrofitted or externally attached to the classification system 1, higher reliability is required for the recognition processing information of the support system 2, and depending on the situation, it may be required to prove the validity of the recognition processing information of the support system 2. In some cases, the manufacturer of the classification system 1 is different from the manufacturer of the support system 2, and the support system 2 whose validity can be easily proved also has the effect of reducing the obstacle to introduction to the article processing system S.

The support system 2, which encrypts the recognition processing information for output to the outside, can reduce the risk of falsification of the recognition processing information. In the support system 2, the second recognition processing is executed a plurality of times based on the image data acquired sequentially. Since the recognition processing information includes the recognition record of the second recognition processing of each time, the validity of the second recognition processing of each time can be proved.

For example, since the recognition processing information includes the image data processed by the second recognition processing of each time, the validity of the recognition processing information can be proved by ex post facto verification of the image data. Since the recognition processing information includes the execution date and time of the second recognition processing of each time, the validity of the recognition processing information can be proved from the post-verification in chronological order. Since the recognition processing information includes the execution date and time of the second recognition processing of each time and the recognized destination information, the validity of the recognition processing information can be proved from the comparison between the recognition processing information and the delivery record including the delivery date and time and the delivery destination. Since the recognition processing information includes the number of successes of the second recognition processing to which billing is applicable as aggregated data, the number of billings can be clearly presented. When one or more destinations are recognized by one-time second recognition processing, the information processing unit 22 adds 1 to the number of successes of the second recognition processing, thereby making it possible to prevent billing omission for the recognition of at least one article.

Even in a case where the classification system 1 receives the recognition processing information output from the support system 2 and integrates and manages the recognition processing information by the first recognition unit and the recognition processing information by the second recognition unit from the support system 2, it is possible to present the independent recognition processing information of the second recognition unit held by the support system 2, and therefore it is possible to prove the validity of the recognition processing on the support system 2 side.

While certain embodiments have been described, these embodiments have been presented by way of example only, and are not intended to limit the scope of the invention. These new embodiment can be implemented in various other forms. Various omissions, replacements, and changes can be made without departing from the spirit of the invention. The accompanying claims and their equivalents are intended to cover such forms or modifications as would fall within the scope and spirit of the inventions.

The invention claimed is:
1. An information processing apparatus comprising:
a second recognition unit that recognizes, by second recognition processing different from first recognition processing, a destination of an article with the destination not recognized by the first recognition processing by a first recognition unit;
an information processing unit that generates recognition processing information,
the recognition processing information including:
record information of the second recognition processing executed respective times by the second recognition unit; and aggregated data in which records of processing executed respective times are collected, the record information including: recognition success in which one or more classification destinations with no contradiction in comparison of information obtained by the second recognition processing with database for recognition are specified; or recognition failure in which no classification destination is specified, the recognition processing information proving validity of data of the recognition success to which billing is applicable by comparing the record information with the aggregated data; and an information output unit that outputs the recognition processing information.

2. The information processing apparatus according to claim 1, wherein the information processing unit encrypts the recognition processing information.

3. The information processing apparatus according to claim 1, wherein the recognition processing information includes image data processed by the second recognition processing of each time.

4. The information processing apparatus according to claim 1, wherein the recognition processing information includes execution date and time of the second recognition processing of each time and the recognized destination.

5. The information processing apparatus according to claim 1, wherein the recognition processing information proves validity of data of the recognition success to which billing is applicable by comparing a number of successes of recognition and a number of failures of recognition with the aggregated data.

6. The information processing apparatus according to claim 1, wherein the recognition processing information includes a flag that is established if recognition succeeds and not established if recognition fails, and proves validity of data of the recognition success to which billing is applicable by making comparison with a number of flags in the aggregated data.

7. The information processing apparatus according to claim 1, wherein the information output unit outputs the recognition processing information to an external terminal apparatus.

8. A non-transitory computer-readable storage medium storing a program for causing a computer to execute:

a procedure for recognizing, by second recognition processing different from first recognition processing, a destination of an article with the destination not recognized by the first recognition processing;

a procedure for generating recognition processing information, the recognition processing information including: record information of the second recognition processing executed respective times; and aggregated data in which records of processing executed respective times are collected, the record information including: recognition success in which one or more classification destinations with no contradiction in comparison of information obtained by the second recognition processing with database for recognition are specified; or recognition failure in which no classification destination is specified, the recognition processing information proving validity of data of the recognition success to which billing is applicable by comparing the record information with the aggregated data; and a procedure for outputting the recognition processing information.

9. An information processing method comprising:

recognizing, by second recognition processing different from first recognition processing, a destination of an article with the destination not recognized by the first recognition processing;

generating recognition processing information, the recognition processing information including: record information of the second recognition processing executed respective times; and aggregated data in which records of processing executed respective times are collected, the record information including: recognition success in which one or more classification destinations with no contradiction in comparison of information obtained by the second recognition processing with database for recognition are specified; or recognition failure in which no classification destination is specified, the recognition processing information proving validity of data of the recognition success to which billing is applicable by comparing the record information with the aggregated data; and outputting the recognition processing information.

* * * * *